Dec. 20, 1932.    S. W. MILLER    1,891,314
METHOD OF PRODUCING A HEATING OR WELDING FLAME
Original Filed May 15, 1928
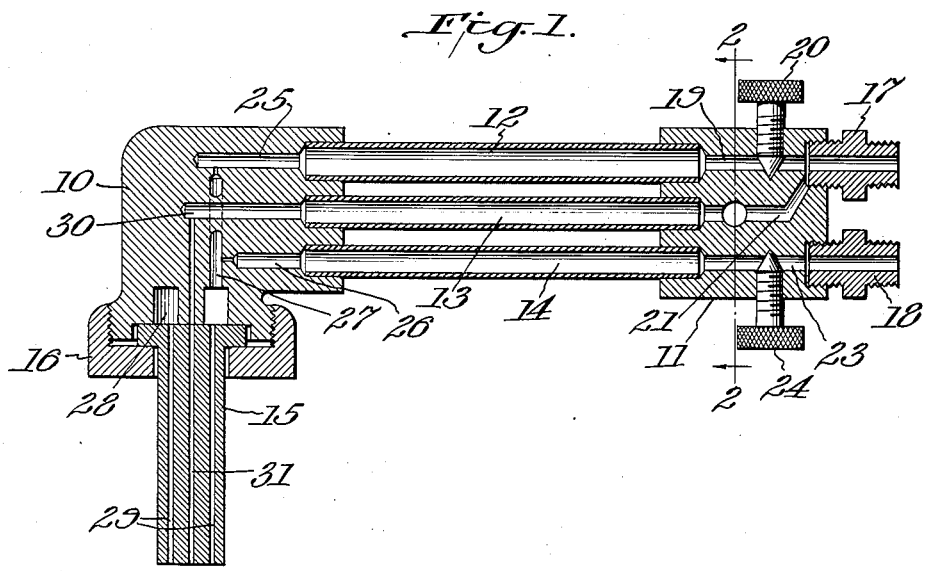
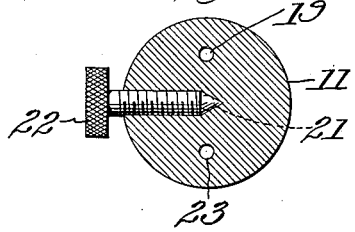
Inventor:
Samuel W. Miller,
By Byrnes Townsend & Buckenstein,
Attorneys Patented Dec. 20, 1932

1,891,314

UNITED STATES PATENT OFFICE

SAMUEL W. MILLER, OF HOLLIS, NEW YORK, ASSIGNOR TO OXWELD ACETYLENE COMPANY, A CORPORATION OF WEST VIRGINIA

METHOD OF PRODUCING A HEATING OR WELDING FLAME

Application filed May 15, 1928, Serial No. 278,024. Renewed July 28, 1930.

This invention relates to the art of heating and fusion welding of metals, and more particularly to a method of producing a heating or welding flame wherein the heating value of the fuel gas is more completely utilized by introducing auxiliary oxygen into the combustion zone.

It is well known in the welding art that an oxy-acetylene welding or heating flame is hottest when the acetylene is burned with an equal volume of oxygen, and that a flame containing a substantial excess of either gas has an injurious effect upon certain metals such as steel. It is also well known that the oxyacetylene flame burns in two stages. In the primary stage the acetylene combines with the oxygen that has been mixed with it in the welding torch to form a combustible mixture and produces hydrogen and carbon monoxide. In the secondary stage the hydrogen and carbon monoxide combine with the oxygen of the air and produce water vapor and carbon dioxide. Much of the heat evolved during secondary combustion is wasted because a large portion of the combustible gases formed during the primary combustion do not burn until after they have passed the portion of the metal being welded or heated.

The principal object of this invention is to accelerate the secondary combustion and cause it to occur sooner and closer to the work being welded so that more of the heat units in the fuel gas will be utilized in the welding operation. Other important objects are to effect an economy in the volume of gases required to produce an efficient welding flame; and to render it possible to employ a higher welding speed with a given volume of the welding gases. These and other objects and the novel features of my invention will appear from the following description taken with the accompanying drawing which illustrates a blowpipe for attaining the objects of this invention. In the drawing, Fig. 1 is a longitudinal sectional view of an oxy-acetylene welding blowpipe;

Fig. 2 is a transverse sectional view of the blowpipe in Fig. 1, taken along the line 2—2, showing the construction of the valve controlling the auxiliary oxygen supply to the welding flame; and, Fig. 3 is a view of the outer end of the welding tip of Fig. 1, showing the relative positions of the heating or welding flame orifices and auxiliary oxygen orifice.

Broadly speaking, my improved method of producing a heating or welding flame consists in first mixing a suitable fuel, such as acetylene or other hydrocarbon, with sufficient oxygen to support the primary combustion of the fuel. In order to accelerate the secondary combustion and cause it to take place closer to the weld that is being produced, a relatively small volume of additional oxygen, preferably commercially pure oxygen, is injected into the combustion zone. This auxiliary oxygen combines with the products of the primary combustion and produces a greater amount of local heat than when these products are burned in the presence of air farther away from the primary combustion zone. This action is intensified when the flame is presented to the piece to be welded. Too great an amount of auxiliary oxygen will oxidize portions of the elements in the metal being welded, but the auxiliary oxygen supply as well as the oxygen mixed with the fuel gas are independently regulated and so controlled that the total volume of oxygen employed will be insufficient to render the flame detrimentally oxidizing when such flame is used for heating or welding metal. A limited oxidation of the silicon, manganese, carbon and iron in the metal is usually not objectionable; on the contrary, it produces additional heat for the welding operation. I have found that the use of a relatively small volume of oxygen in a flame according to my invention has decided advantages in fusion welding particularly, since it results in a more complete utilization of the heat units of the fuel gas and due to the additional heat rendered available at the welding point, the welding may be done more rapidly, thus economizing gas, time and labor in the welding operation.

I am aware that free oxygen has been projected through a combustion zone, as in the well known oxy-acetylene cutting blowpipe used for cutting metals, but the cutting oxygen valve in such blowpipes is purposely so arranged that it opens wide very quickly so as to deliver an oxygen jet of large volume at high pressure for cutting by oxidizing or burning away the metal along the line of the cut. My method relates to fusion welding as distinguished from cutting, and in it I employ a very much smaller volume of free oxygen of very low pressure, and regulate the supply of oxygen so that the total quantity of oxygen shall be insufficient to render the flame detrimentally oxidizing when used for fusion welding of metal.

The welding blowpipe shown for the purpose of illustrating the invention is composed of a metallic head 10 and a metallic tail member 11 connected by three metal pipes or tubes 12, 13, and 14, which may be soldered into sockets provided in the head and tail members in the usual manner. A tip 15 of suitable metal is secured to the head 10 by any convenient means such as a detachable nut 16. A flexible tube conveying oxygen in the form of an oxygen concentrate (preferably commercially pure oxygen) from the usual cylinder of compressed oxygen to the blowpipe may be connected to the tail 11 by means of a nipple 17; and a similar tube conveying acetylene or other fuel gas from the usual cylinder of dissolved or compressed fuel gas to the torch may be connected to the tail member 11 by means of a nipple 18. A conduit 19 within the tail 11 conducts oxygen from the inlet nipple 17 to the tube 12 and its volume may be controlled by a valve 20. A conduit 21 in the tail member 11 conducts oxygen from the inlet nipple 17 to the tube 13 and its volume may be controlled by a valve 22. A conduit 23 within the tail member 11 conducts acetylene from the acetylene inlet nipple 18 to the tube 14 and its volume may be controlled by a valve 24. Conduits 25 and 26 in the head 10 conduct oxygen and acetylene respectively from the tubes 12 and 14 to a conduit 27 where they mix and pass into a mixing and distributing chamber 28. From the chamber 28 the mixture of fuel gas and oxygen passes out through conduits 29 in the tip 15. Oxygen entering the tube 13 passes through a conduit 30 in the head 10 and from there out through a central conduit 31 in the tip 15. The valves 20, 22, and 24, are constructed so the pressure and volume of the gas passing through each of them may be accurately and independently controlled.

Four combustible gas passages 29 terminating in a series of four orifices arranged in the circumference of a circle are shown in the tip 15. This particular number is not important as I have secured good results with either a circle of orifices or an annular orifice arranged to produce a hollow flame into which the auxiliary oxygen may be introduced through an orifice at the delivery end of the central oxygen passage 31. The arrangement of the orifices may be reversed and the auxiliary oxygen introduced around a central flame but I have secured greater economy of the gases and greater speed in welding with the arrangement shown. The central auxiliary oxygen orifice should preferably be somewhat larger than the cutting oxygen orifice of a cutting torch to reduce the velocity of the issuing gas, as the oxygen combines with the partially burned gases more rapidly and gives better results when it is discharged at a much lower velocity as compared with the cutting oxygen jet.

In practicing the process herein described the operation of the welding torch shown in the accompanying illustration is as follows: The valve 24 is partially opened permitting acetylene to flow through the tube 14, head conduits 26 and 27, distributing chamber 28, tip conduits 29, and discharge from the outlet orifices of the conduits 29. The escaping acetylene is ignited and the size of its flame is regulated in the usual manner by adjusting the valve 24. Then the valve 20 is partially opened permitting oxygen to flow through the tube 12 and conduit 25 into the conduit 27 where it mixes with the acetylene forming a combustible mixture that passes out through the chamber 28 and conduits 29. The passages or conduits inside the torch where, prior to its delivery from the orifices of the passages 29, oxygen is mixed with the acetylene to form a mixture that will support primary combustion, I choose to term the pre-combustion zone. The valves 20 and 24 are adjusted so a suitable welding flame is formed as in other welding torches well known in the art. The auxiliary oxygen control valve 22 is now partially opened permitting auxiliary oxygen to flow through the tube 13 and conduits 30 and 31 and discharge from the outlet of the conduit 31 where it mixes with the welding flame just outside of the outlets of passages 29 in what I choose to term the combustion zone. This free oxygen that is injected substantially centrally into the welding flame at the combustion zone I term auxiliary oxygen to distinguish it from the oxygen that is mixed with the acetylene in the pre-combustion zone.

The welding operation may now be started. As the metal being welded commences to fuse further adjustment of the auxiliary oxygen control valve 22 may be necessary as more auxiliary oxygen may be required when welding some metals than others. If too small an amount of auxiliary oxygen is used the welding speed will be too low and the full advantages of this process will not be obtained. If too large an amount of auxiliary oxygen is used some metals such as steel will be burned to a detrimental extent. This latter condition is indicated by an unusually large amount of sparks thrown from the weld or by a foaming of the molten metal the same as when an excess oxygen flame is used in welding as heretofore practiced. It is believed that when metals are welded in ordinary atmosphere they are burned somewhat but not to a detrimental extent, and I have found that the heat of the welding flame may be concentrated upon the weld and the welding speed substantially increased by the introduction of auxiliary oxygen into the combustion zone without burning the metal to a detrimental extent, if indeed any more than with the neutral welding flame ordinarily used. In welding one-half inch steel plate I have successfully used a volume of auxiliary oxygen in the combustion zone that was 20% of the volume of oxygen supplied to the mixture in the precombustion zone. Thus, by injecting part of the oxygen into the combustion zone I have successfully used a volume of oxygen that was 1.2 times the volume of the acetylene used and the welding speed of the flame was considerably increased without detrimentally burning the metal. But a like quantity of oxygen (1.2 times the volume of the acetylene), if mixed directly with the acetylene in the pre-combustion zone, is impractical for heating or welding purposes because it decreases the welding speed of the flame and detrimentally burns the metal.

I have demonstrated that auxiliary oxygen introduced into the combustion zone produces a different effect upon the welding flame from that produced when additional oxygen is mixed with the usual oxy-acetylene mixture in the pre-combustion zone, and I believe the difference in action to be as follows: The oxy-acetylene flame is hottest when the acetylene is mixed with an equal quantity of oxygen in the pre-combustion zone, because this is the correct mixture for complete primary combustion. Also, most of the heat that does the welding is derived from the primary combustion. A large part of the secondary combustion occurs after the combustible gases have passed the area being welded because the secondary combustion is supported by the oxygen of the air, and so takes place over a large area instead of being concentrated as in the case of the primary combustion. Also, the secondary combustion is comparatively slow, and the welding area is near the beginning of its zone. Therefore, when an excess of oxygen is mixed with the acetylene in the pre-combustion zone there is more than enough in the mixture to complete primary combustion, and the excess oxygen absorbs heat as it passes through the zone of primary combustion thereby lowering the flame temperature. Some of this excess oxygen may combine with the products of the primary combustion to help support the secondary combustion, but much of it reaches the fused metal first and burns the latter; what is left helps in the secondary combustion, but beyond the welding area, so that the heat from the combustion supported by such excess oxygen is either wasted or has a detrimental effect. Now, when auxiliary oxygen is properly injected into the combustion zone according to my improved procedure it does not lower the temperature of the primary combustion but, instead, combines with the products of the primary combustion at the welding area, producing a large amount of heat where it can be used for melting the metal, instead of being wasted beyond the welding area. Therefore, an excess of oxygen introduced into the pre-combustion zone reduces the welding speed, but auxiliary oxygen introduced into the combustion zone so stimulates and localizes secondary combustion that a greater welding speed may be employed.

I have already indicated that the free oxygen jet which is passed through the combustion zone, as in the well known oxy-acetylene cutting torch, operates in a way that differs radically from my invention. Because of the very high velocity of such a jet, substantially none of it can assist in supporting either the primary or the secondary combustion in the heating flame. It is used solely for the purpose of oxidizing heated metal to produce a cut. The following test data will clearly present the difference between my method of producing an improved heating or welding flame and the prior oxy-acetylene cutting process. In a cutting torch having a given size outlet orifice for the cutting oxygen jet, the required gage pressure for the cutting oxygen was about 50 pounds and the corresponding velocity of the oxygen at the orifice was about 2,000 feet per second. Using the same size auxiliary oxygen orifice in a heating or welding torch, the proper pressure of the auxiliary oxygen was about one-eighth of a pound and its velocity at the orifice only about 75 feet per second. In general, therefore, the auxiliary oxygen for heating and welding must be so regulated that its velocity will be so low that substantially none of it passes beyond the combustion zone; whereas the cutting oxygen is invariably so regulated that its pressure is high enough to carry all of it beyond the combustion zone.

While the description of the process described herein has been confined to an oxy-acetylene flame for the sake of simplicity, auxiliary oxygen may, nevertheless, be used to advantage with the flames of other hydrocarbons or fuel gases. Also, oxygen in other forms such as the oxygen of the air may be mixed with the fuel in place of an oxygen concentrate to support primary combustion. Furthermore, the auxiliary oxygen may be introduced into the combustion zone by methods different from those shown. These and other changes may be made in the method of practicing the process without departing from the invention.

I claim:

1. The method of producing a heating or welding flame which comprises passing a stream of hydrocarbon through a pre-combustion zone to a combustion zone; mixing oxygen with the hydrocarbon in the pre-combustion zone to support primary combustion; injecting additional oxygen into the combustion zone to stimulate and localize the secondary combustion; and so regulating the total quantity of oxygen employed that it shall be insufficient to render the flame detrimentally oxidizing when used for heating or welding metal.

2. The method of producing a welding or heating flame which comprises passing a stream of acetylene through a pre-combustion zone to a combustion zone; mixing oxygen with the acetylene in the pre-combustion zone to support primary combustion; injecting additional oxygen into the combustion zone to stimulate and localize the secondary combustion; and so regulating the total quantity of oxygen employed that it shall be insufficient to render the flame detrimentally oxidizing when used for welding or heating metal.

3. The method of producing a welding flame which comprises passing a stream of hydrocarbon gas through a pre-combustion zone to a combustion zone; mixing oxygen as an oxygen concentrate with the hydrocarbon in the pre-combustion zone to support primary combustion; injecting additional oxygen as an oxygen concentrate into the combustion zone to stimulate and localize the secondary combustion; and so regulating the total quantity of oxygen employed that it shall be insufficient to render the flame detrimentally oxidizing when used for fusion welding of metals.

4. The method of producing a heating or welding flame which comprises passing a stream of hydrocarbon gas through a pre-combustion zone to a combustion zone; mixing oxygen with the hydrocarbon in the pre-combustion zone to support primary combustion; injecting additional oxygen into the combustion zone to stimulate and localize the secondary combustion; and independently so regulating the supply of oxygen to the pre-combustion zone and the supply of additional oxygen to the combustion zone that the total quantity of oxygen employed shall be insufficient to render the flame detrimentally oxidizing when used for heating or welding metal.

5. The method of producing a welding flame which comprises passing a stream of acetylene through a pre-combustion zone to a combustion zone; mixing oxygen as an oxygen concentrate with the acetylene in the pre-combustion zone to support primary combustion; and injecting additional oxygen as an oxygen concentrate into the combustion zone to stimulate and localize the secondary combustion; the total quantity of oxygen employed being insufficient to render the flame detrimentally oxidizing when used for fusion welding.

6. The method of producing a flame adapted for fusion welding of metals which comprises passing a stream of acetylene through a pre-combustion zone to a combustion zone; mixing oxygen as an oxygen concentrate with the acetylene in the pre-combustion zone to support primary combustion; injecting additional oxygen as an oxygen concentrate into the combustion zone to stimulate and localize the secondary combustion; and independently so regulating the supply of additional oxygen to the combustion zone and the supply of oxygen to the pre-combustion zone that the total quantity of oxygen employed for both primary and secondary combustion shall be insufficient to render the flame detrimentally oxidizing when used for fusion welding of metals.

7. The method of producing a heating or welding flame which comprises passing a stream of hydrocarbon through a pre-combustion zone to a combustion zone; mixing only sufficient oxygen with the hydrocarbon in the pre-combustion zone to support substantially complete primary combustion; injecting additional oxygen into the combustion zone to stimulate and localize secondary combustion; and so regulating the supply of such additional oxygen that the quantity thereof passing beyond the combustion zone shall be insufficient to render said flame detrimentally oxidizing when used for heating or welding metal.

8. The method of producing a heating or welding flame which comprises passing a stream of hydrocarbon through a pre-combustion zone to a combustion zone; mixing oxygen with the hydrocarbon in the pre-combustion zone to support primary combustion; injecting additional oxygen into the inner portion only of the combustion zone to stimulate and localize the secondary combustion; and so regulating the total quantity of oxygen employed that it shall be insufficient to render the flame detrimentally oxidizing when used for heating or welding metal.

9. The method of producing a welding flame which comprises passing a stream of acetylene through a pre-combustion zone to a combustion zone; mixing oxygen as an oxygen concentrate with the acetylene in the pre-combustion zone to support primary combustion; injecting additional oxygen as an oxygen concentrate into the inner portion only of the combustion zone to stimulate and localize the secondary combustion; and independently regulating both the oxygen supplies so that the total quantity of oxygen employed shall be insufficient to render the flame detrimentally oxidizing when used for fusion welding of metals.

10. The method of producing a flame adapted for fusion welding of metals which comprises passing a stream of acetylene through a pre-combustion zone to a combustion zone; mixing oxygen as an oxygen concentrate with the acetylene in the pre-combustion zone; regulating such oxygen to supply only a sufficient quantity for complete primary combustion of the acetylene; injecting additional oxygen as an oxygen concentrate substantially centrally into the combustion zone to stimulate and localize the secondary combustion; and independently so regulating the supply of additional oxygen that the quantity of oxygen employed shall be insufficient to render the flame detrimentally oxidizing when used for fusion welding of metals.

11. The method of producing a heating flame which comprises adding oxygen to a hydrocarbon; burning said mixture in air; and adding oxygen to the flame in addition to that supplied by the air to concentrate the heat in an area smaller than that occupied when no oxygen is added to the flame.

12. The method of producing a heating flame which comprises adding oxygen to a hydrocarbon; burning said mixture in air; and adding oxygen to the flame in addition to that supplied by the air in a quantity just sufficient to stimulate secondary combustion and concentrate the flame.

13. The method of producing a heating flame which comprises adding oxygen to a hydrocarbon in a quantity sufficient to support primary combustion; burning said mixture in air; and adding oxygen to the flame in addition to that supplied by the air in a quantity just sufficient to complete secondary combustion and stimulate and localize the flame.

In testimony whereof, I affix my signature.

SAMUEL W. MILLER.